United States Patent
Bird (10) Patent No.: US 8,011,614 B2
(45) Date of Patent: Sep. 6, 2011

(54) BIRD VORTEX FLYING MACHINE

(76) Inventor: Stanley W. Bird, Lincoln, NE (US)

( * ) Notice: Subject to any disclaimer, the term of this patent is extended or adjusted under 35 U.S.C. 154(b) by 932 days.

(21) Appl. No.: 12/100,901

(22) Filed: Apr. 10, 2008

(65) Prior Publication Data

US 2009/0039206 A1 Feb. 12, 2009

Related U.S. Application Data

(60) Provisional application No. 60/910,843, filed on Apr. 10, 2007.

(51) Int. Cl.
*B64C 27/82* (2006.01)
*B64C 27/18* (2006.01)

(52) U.S. Cl. ............... 244/17.19; 244/17.11; 244/17.25; 244/7 A; 244/12.2; 244/23 C; 416/20 R; 416/21

(58) Field of Classification Search ............... 244/6, 7 A, 244/7 B, 12.2, 23 C, 17.11, 17.19, 17.25, 244/60, 17.23; 416/20 R, 21, 22
See application file for complete search history.

(56) References Cited

U.S. PATENT DOCUMENTS

| | | | | |
|---|---|---|---|---|
| 1,133,660 | A | | 3/1915 | Papin et al. |
| 2,437,700 | A | * | 3/1948 | MacFarland, Jr. ............ 416/171 |
| 2,509,359 | A | | 5/1950 | Del Pesaro |
| 2,594,788 | A | | 4/1952 | Morain |
| 2,710,067 | A | | 6/1955 | Ssforza |
| 2,724,446 | A | * | 11/1955 | Hill ............................ 244/17.25 |
| 2,831,543 | A | | 4/1958 | Matthews |
| 2,862,680 | A | * | 12/1958 | Berger ....................... 244/17.19 |
| 2,870,847 | A | * | 1/1959 | Fry ............................... 416/171 |
| 3,010,678 | A | * | 11/1961 | Gose .......................... 244/17.11 |
| 3,176,413 | A | | 4/1965 | Dornier |
| 3,371,718 | A | | 3/1968 | Bacon |
| 3,395,876 | A | * | 8/1968 | Green ......................... 244/23 C |
| 3,417,825 | A | | 12/1968 | Ramme |
| 3,437,290 | A | * | 4/1969 | Norman ...................... 244/12.2 |
| 3,484,172 | A | * | 12/1969 | Reed ............................. 416/171 |
| 3,507,461 | A | * | 4/1970 | Rosta .......................... 244/12.2 |
| 3,532,303 | A | * | 10/1970 | Farkas ........................ 244/23 C |
| 3,610,555 | A | | 10/1971 | Nagler |
| 3,677,503 | A | * | 7/1972 | Freeman, Jr. ............... 244/23 C |
| 3,699,771 | A | | 10/1972 | Chelminski |
| 3,722,830 | A | | 3/1973 | Barber |
| 3,768,926 | A | | 10/1973 | Pegg et al. |
| 3,873,049 | A | | 3/1975 | Horsdal |

(Continued)

OTHER PUBLICATIONS

U.S. Air Force Fact Sheet: American Helicopter Co. XH-26 Jet Jeep (1952) http://www.nationalmuseum.af.mil/factsheets/factsheet_print.asp?fsID=583&page=1.

*Primary Examiner* — Joshua Michener
*Assistant Examiner* — Steven Hawk
(74) *Attorney, Agent, or Firm* — Robert Platt Bell (57) ABSTRACT

The present invention comprises, in one embodiment, an inexpensive, lightweight flying vehicle using fixed pitch helicopter blades powered by ramjet engines mounted to a power-ring which transfers torque to the lifting rotors. The use of fixed pitch blades eliminates the need for a tail boom and tail rotor, as well as for variable incidence control of blade pitch and/or cyclic and collective rotor-pitch controls. An optional ballistic parachute may be deployed for emergency landings. A radial shroud encloses the ramjet engines to act as a sound shield. Since the rotor has a fixed pitch, lift may be controlled by rotor speed, where increased speed results in ascent, and decreased speed, descent.

16 Claims, 5 Drawing Sheets

U.S. PATENT DOCUMENTS

| | | |
|---|---|---|
| 3,930,625 A | 1/1976 | Krivka |
| 4,589,611 A | 5/1986 | Ramme et al. |
| 5,149,014 A | 9/1992 | Faller |
| 5,370,341 A | 12/1994 | Leon |
| 5,791,592 A | 8/1998 | Nolan et al. |
| 5,842,665 A * | 12/1998 | McKinney et al. ........... 244/7 A |
| 5,984,635 A | 11/1999 | Keller |
| 6,216,446 B1 | 4/2001 | Stram |
| 6,390,413 B1 | 5/2002 | Chiu |
| 7,559,506 B2 * | 7/2009 | Kissel, Jr. .................. 244/17.11 |
| 7,789,341 B2 * | 9/2010 | Arlton et al. .................. 244/7 B |
| 7,802,755 B2 * | 9/2010 | Poltorak ..................... 244/23 C |
| 2002/0125368 A1 | 9/2002 | Phelps et al. |
| 2004/0000614 A1 | 1/2004 | Levya |
| 2005/0082421 A1 * | 4/2005 | Perlo et al. ................... 244/12.2 |
| 2006/0011777 A1 * | 1/2006 | Arlton et al. .................. 244/7 B |
| 2006/0060693 A1 * | 3/2006 | Poltorak ................... 244/17.11 |
| 2009/0145997 A1 * | 6/2009 | Kissel, Jr. .................. 244/17.23 |

* cited by examiner

BIRD VORTEX FLYING MACHINE

CROSS-REFERENCE TO RELATED APPLICATIONS

The present application claims priority from Provisional U.S. Patent Application No. 60/910,843 filed on Apr. 10, 2007, and incorporated herein by reference.

FIELD OF THE INVENTION

The present invention relates to helicopters and rotary wing vertical flight aircraft. In particular, the present invention is directed toward a rotary wing vertical flight aircraft using ramjets or other thrust devices mounted on a power ring, which transfers torque to the lifting rotors.

BACKGROUND OF THE INVENTION

A number of helicopters and rotorcraft using ramjets or the like, mounted on the tips of the rotors, are known in the art. Probably the most famous and most operable of these was the American Helicopter XA-8/XH-26 "Flying Jeep" aircraft. The Model XA-8 single-seat lightweight helicopter was a light, collapsible machine, which could be used as both a light observation craft and as an air-droppable rescue vehicle for downed aircrew. The XH-26 was powered by two pulse-jet engines, one fixed to the tip of each main rotor blade, and could burn virtually any type of fuel. Another novel feature of this aircraft was the use of a single-bladed, counterbalanced tail-rotor (presumably for packaging reasons). The Army and Air Force jointly evaluated the five XH-26 prototypes from 1952 to 1954. The machines were found to be robust in construction and relatively simple to operate, but neither service procured the type in quantity. One problem noted by users was that the pulse-jet engines were quite loud when in use, and the aircraft exhibited a "screaming" noise when in use.

Other helicopters using thrust engines on rotor tips as well as air jets and other devices are known in the art. The following Patents and published Patent Applications, all incorporated herein by reference, were discovered in a Prior Art search commissioned by Applicant.

U.S. Pat. No. 3,417,825, entitled "HELICOPTER ROTOR AND TURBINE ASSEMBLY" (RAMME) discloses a helicopter with counter rotating rotor blades that are driven by jet engine exhaust. Thus device, rather that using wing-tip pulse-jets, uses a rather cumbersome radial turbine mounted to the blade. Note the lack of tail rotor. The device does appear to use a pitch and cycle control.

U.S. Pat. No. 4,589,611, entitled "Air jet reaction contrarotating rotor gyrodyne" (RAMME) discloses a contra-rotating rotor gyro-dyne which has twin turbofan engines providing forward jet thrust with a bypass air fraction for rotating rotors. This design uses jet exhaust ducted into the tips of counter-rotating rotors. See FIG. 3. The design appears to use a pitch control. See FIG. 6. The apparatus appears to be directed more toward a gyrocopter design than a helicopter.

U.S. Pat. No. 3,176,413 (DORNIER) discloses a helicopter with a jet-tip type propulsion system. This apparatus is disclosed as a "training apparatus" rather than as a flyable helicopter. The design does show the use of wing-tip jet engines.

U.S. Pat. No. 2,437,700 (MACFARLAND, JR.) discloses a dual rotor helicopter with reaction motor propulsion. This design uses rotating jets, but they are not attached to the wing tips, but rather to a separate boom. A gearbox transmits this energy to counter-rotating rotor blades.

U.S. Pat. No. 2,509,359 (MARGOLIS) discloses a rotary reaction motor. This reference broadly teaches the concept of using a pulse-type jet to power a propeller. Note how the jet angle may be changed to alter thrust.

U.S. Pat. No. 2,710,067 (SFORZN) discloses a rotorcraft with rotor tip propulsion. This reference also teaches the use of a wingtip jet rotor using an engine driven compressor. Note the lack of counter-rotating rotors, however.

U.S. Pat. No. 2,594,788 (MORAIN) discloses a blade tip propulsion system. This reference is directed toward solving one of the detailed problems in providing fuel to rotor-tip mounted engines.

U.S. Pat. No. 3,371,718, entitled "ROTARY JET REACTION MOTORS," (BACON) discloses a rotary jet reaction motor for wing blades. This reference also teaches the use of wing-tip mounted jets. Note the pitch control gears in FIG. 2.

U.S. Pat. No. 3,699,771, entitled "ROTARY WING AIRCRAFT LIFT AND PROPULSION METHOD AND SYSTEMS" (CHELMINSKI) discloses a rotary wing aircraft lift and propulsion method and system in which burner thruster units mounted on the lift-producing rotor at a position spaced radially from the axis of the rotor generate moments to turn the rotor about its axis. This reference also teaches the use of wing-tip mounted jets in a single rotor configuration.

Published U.S. Patent Application 20040000614A1 entitled "Method and apparatus for lifting and propelling rotorcraft (LEYVA) discloses a lifting and propelling apparatus for a rotorcraft, which has pulse detonation engines, which impulsively detonate fuel-air mixtures to generate and apply thrust forces to rotor assembly. This recent reference to GE Research shows the use of a jet mounted to the HUB of the rotor (FIG. 2), the rotor itself (FIG. 3) and within the rotor (FIG. 4). A pulse detonation engine is described.

U.S. Pat. No. 3,930,625 (KRIVKA) discloses a steam jet powered helicopter, which has shroud surrounding blade nozzles to condense and recycle steam. See FIG. 9. See paragraph at column 5, line 57 for description of FIG. 9.

U.S. Pat. No. 5,149,014, entitled "Rotary wing aircraft" (FALLER) discloses a rotation compensated helicopter drive, which incorporates hollow blades and compressed air ducted to exit slots from central turbine.

U.S. Pat. No. 5,984,635, entitled "Keller pressure jet rotor system" (KELLER) discloses a pressure jet rotor system in helicopters.

U.S. Pat. No. 3,768,926, entitled "PULSE JET ROTOR DRIVE FOR HELICOPTER" (PEGG) discloses a pulse-jet system for driving a rotary wing aircraft. In a first embodiment the tips of the rotors of a rotary wing aircraft are provided with "U"-shaped valveless pulse jet engines having an annular scoop adjacent to the lip of the inlet to provide fresh air thereto at increased air velocity.

U.S. Pat. No. 6,390,413, entitled "Years two thousand of new safety helicopter" (CHIU) discloses a system for landing a falling helicopter in an accident with at least one parachute mounted on the helicopter, and speed reduction jets mounted at belly portion of helicopter.

U.S. Pat. No. 3,873,049, entitled "Flying machine" (HORSDAL) discloses a VTOL flying machine with four rotors producing upward thrust with rotor slots to provide forward thrust.

U.S. Pat. No. 5,791,592, entitled "Helicopter with coaxial counter-rotating dual rotors and no tail rotor" (NOLAN) discloses a helicopter with coaxial counter rotating dual rotors and no tail rotor. A pair of engines drive a single rotating shaft on which a pair of rotors are mounted.

U.S. Pat. No. 3,722,830, entitled "HELICOPTER TYPE VEHICLE" (BARBER) discloses a helicopter type vehicle having coaxial counter rotating propellers above the cabin of the vehicle, each propeller being fixed in pitch as opposed to conventional helicopter propellers which vary in pitch during rotation of the propeller.

U.S. Pat. No. 3,610,555, entitled "FLUID-DRIVEN ROTARY WING AIRCRAFT" (NAGLER) discloses a rotary wing aircraft which operates during takeoff and landing as a conventional helicopter employing the combined outputs of main and auxiliary compressors.

U.S. Pat. No. 6,216,446, entitled "Valveless pulse-jet engine with forward facing intake duct" (STRAM) discloses a self-starting, self-spirating valveless jet engine which has a supersonic fuel nozzle fitted into the vaporizer tube, positioned in front and to the center of the flared mouth of the first stage intake duct.

Published U.S. Patent Application 20020125368A1, entitled "Ultralight coaxial rotor aircraft" (PHELPS) discloses an ultra-light coaxial dual rotor helicopter includes air-inflated pontoon skids, pitch and roll control by actuators tilting the rotor axis, and yaw control paddles.

U.S. Pat. No. 5,370,341, entitled "Ultralight helicopter and control system" (LEON) discloses an ultra-light helicopter and control system with a single motor drive for counter-rotating rotors via a bevel gearing or hydraulic pump-motors.

U.S. Pat. No. 1,133,660 (PAPIN) discloses a helicopter with air that pushes out of rotor tips.

U.S. Pat. No. 2,831,543 (MATTHEWS) discloses a helicopter with jet pressure driven rotors.

SUMMARY OF THE INVENTION

The present invention comprises, in one embodiment, an inexpensive, lightweight flying vehicle using counter-rotating fixed pitch lifting blades powered by ram jet engines mounted to a power-ring, which transfers torque to the lifting rotor. The use of counter-rotating fixed pitch lifting blades eliminates the need for a tail boom and tail rotor, as well as for variable incidence control of blade pitch and/or cyclic and collective rotor-pitch controls. An optional ballistic parachute may be deployed for emergency landings. A radial shroud encloses the ram jet engines to act as a sound shield and to supply air to the power ring jet engines. Since the rotors have a fixed pitch, lift may be controlled by rotor speed, where increased speed results in ascent, and decreased speed, descent.

In the preferred embodiment, the flying vehicle is power-lifted by ramjet engines in a gyro configuration. The ramjets may comprise two or more engines on a power ring configuration running at a high RPM to produce high-powered torque. This torque is then transferred to the torque configuration where a fixed-pitch lifting rotor is located. Directional control is achieved by tilting the core controller torque configuration. To go forward, the user "tilts" forward. To go right, the user "tilts" right. To go left, the user "tilts" left. To go backward, the user "tilts" backward.

Struts are used to support the soundproofing shroud. In the power-ring embodiment, the power-ring is not attached to the shroud, but rather runs in the shroud. Similarly, the lifting rotor is not attached to the shroud, but are running over the shroud to supply air to the power ring configuration and to the ram jet engines.

The advantages of the design of the present invention are many. The present invention produces a lightweight, low-cost flying vehicle, with very few moving parts and very low maintenance. The machine will run on almost all fuels, and is very stable in gyro hover. The apparatus provides safe and agile navigation, with multi-engine reliability. The machine can fly on one engine much more safely than conventional aircraft and helicopters. The design makes use of one fixed-pitch lifting rotor. Engines and the power ring are buried in a soundproofing shroud, to eliminate the noise problems suffered by Prior Art ram-jet helicopters.

In addition to the above advantages, the apparatus of the present invention also has no wings, no horizontal stabilizer, no elevators, no vertical stabilizer, no ailerons, and unlike the "jet jeep", no tail rotor. The apparatus is safer in an emergency, as the device may auto-rotate to the ground or an optional ballistic parachute may be deployed to further slow descent. In addition, the machine requires no landing gear, further saving weight.

The primary features of the present invention include: (1) The Power Ring Configuration Running In The Shroud; (2) The Power Ring Configuration; (3) The Torque Lifting Rotors; (4) The Power Ring Configuration and Torque Lifting Rotor Running Over The Shroud To Hold Air Pushed Down From The Torque Configuration Lifting Rotor; and (5) The Sound-Proof Shroud.

DETAILED DESCRIPTION OF THE INVENTION

Figure 1:
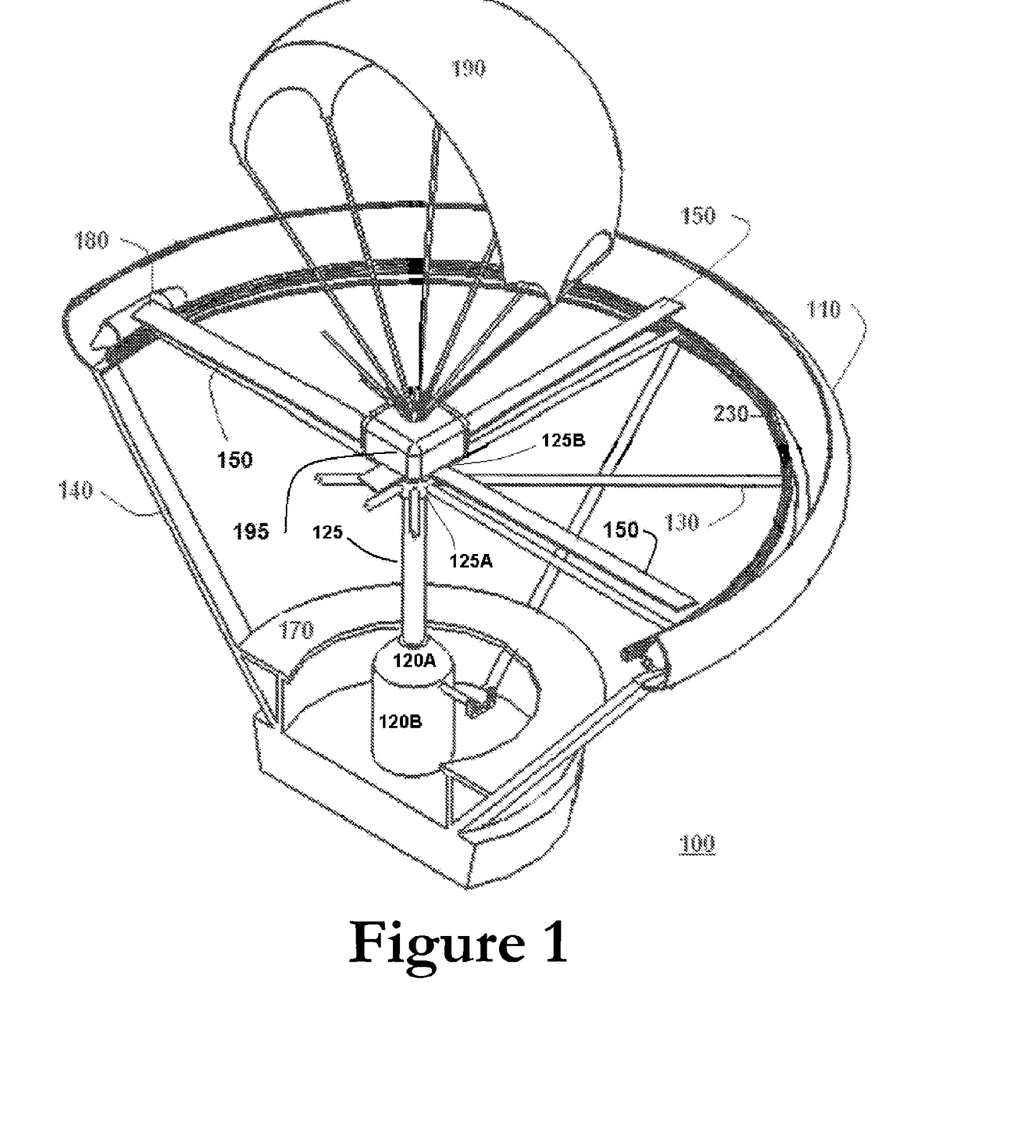
FIG. 1 is a cutaway perspective view of the preferred embodiment of the present invention.
Figure 2:
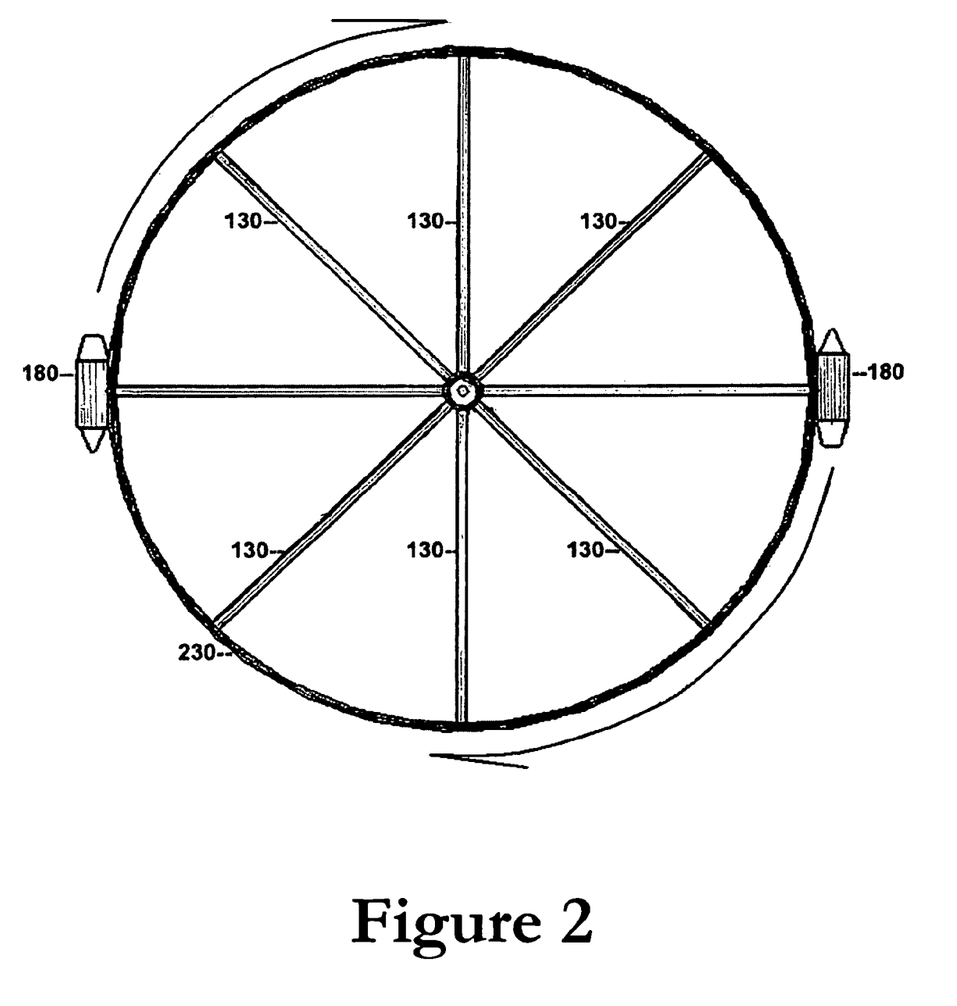
FIG. 2 is top view of power ring 230.
Figure 3:
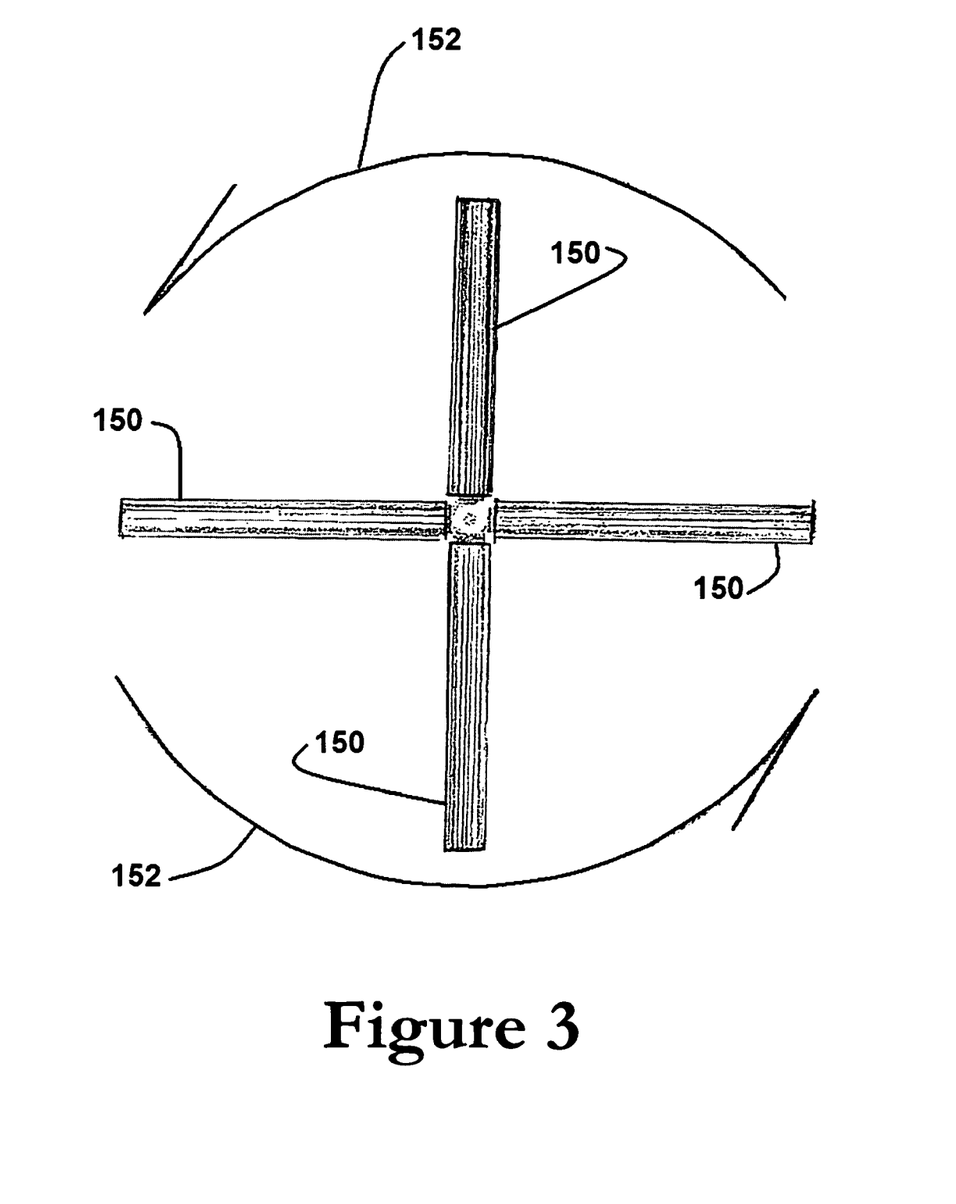
FIG. 3 is a top view of the torque lifting rotor.
Figure 4:
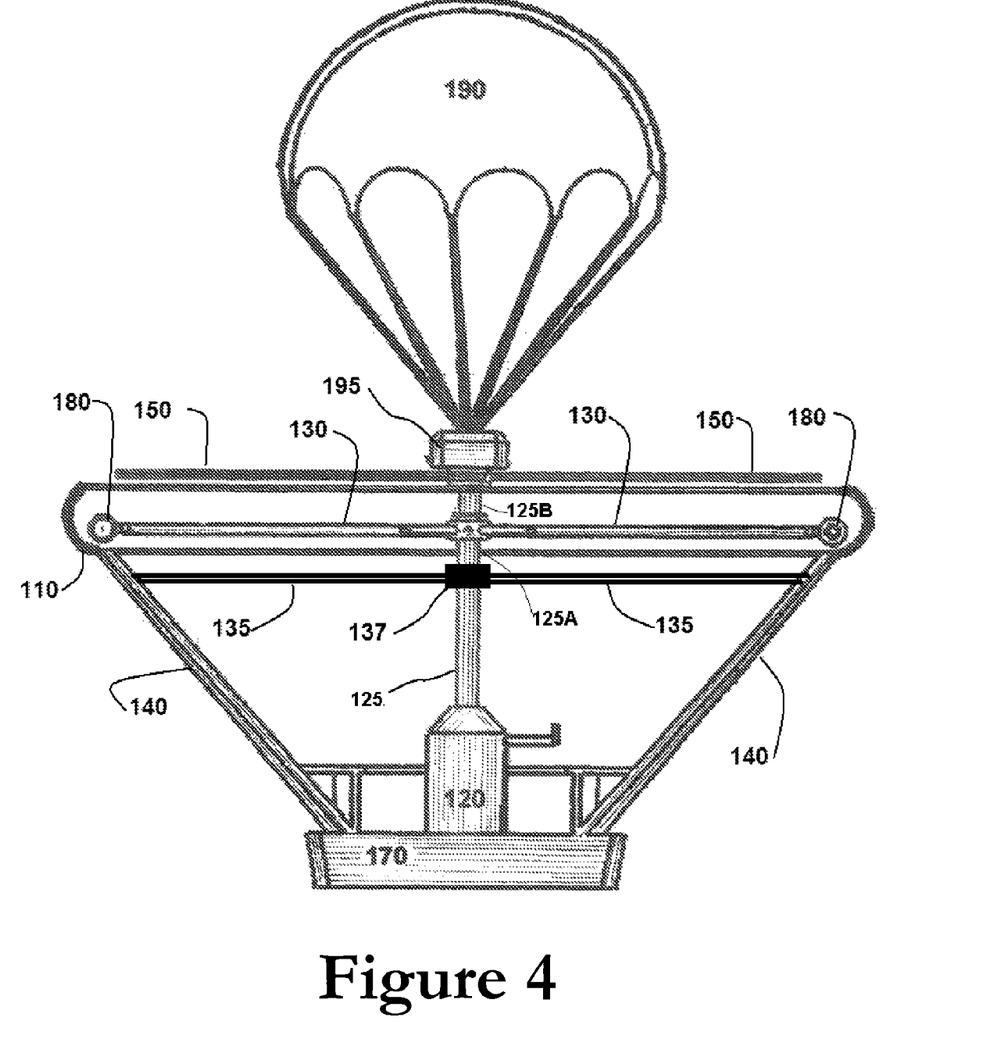
FIG. 4 is a cross-section view of the preferred embodiment of the present invention.
Figure 5:
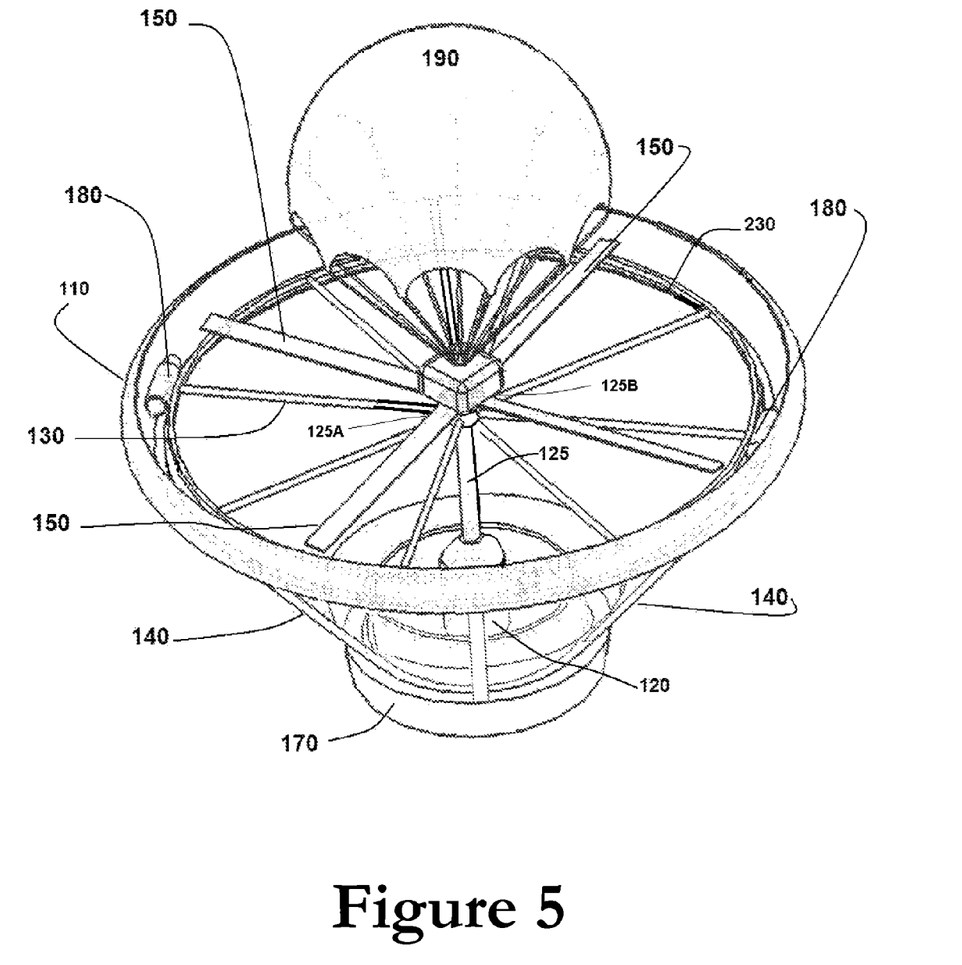
FIG. 5 is perspective view of the preferred embodiment of the present invention.

FIG. 1 is a cutaway perspective view of the preferred embodiment of the present invention. FIG. 2 is top view of power ring 230. FIG. 3 is a top view of the torque lifting rotor. FIG. 4 is a cross-section view of the preferred embodiment of the present invention. FIG. 5 is perspective view of a preferred embodiment of the present invention.

Referring to FIGS. 1-5, apparatus 100 includes power ring 230, which may comprise a number of struts 130 (e.g., six) and a circular ring 230, turning within sound proofing shroud 110. Attached to power ring 230 are one or more ramjets 180, which may comprise a jet engine, rocket engine, pulse-jet engine, ramjet or the like. Ramjet(s) 180 turn power ring 230 within sound proofing shroud 110 to produce rotary shaft motion at concentric shaft 125A of concentric shafts 125. Sound proofing shroud 110 contains the noise created by ramjets 180 to reduce noise and eliminate the banshee effect produced by Prior Art ramjet helicopters.

This rotary motion may in turn be converted, via concentric shafts 125 though control unit and transmission 120, into rotary motion driving rotor 150 via shaft 125B of concentric shafts 125, which may comprise a fixed or variable pitched rotor, or the like. In the preferred embodiment, a single fix pitched rotor is employed with four blades. Torque effects produced by the driving rotor 150 is counteracted, at least in part, by the torque produced by power ring 230.

Sound proofing shroud 110 may be supported by one or more struts 140, which may attach to frame 170 which may be configured to carry one or more passengers, or in a Remotely Operated Vehicle (ROV) embodiment, may support control and communications equipment. Control unit and transmission 120A may contain a small starting engine used to drive power ring 230 so as to provide initial rotation to start ramjets 180. Many types of ramjets require initial air flow in order to ignite, and control unit and transmission 120A may provide such initial control. Control unit and transmission 120A may also contain a fuel supply, instrumentation and electronics, and a control yoke, as shown. Note that other types of controls may be used, including a joystick, levers, pedals, and the like.

As noted above, in the preferred embodiment, rotor 150 comprises a fixed pitch rotor in order to simplify the design. Vertical lift may be controlled by controlling the rpm of rotor 150, simply by throttling fuel supply to ramjets 180. With increased fuel supply, rotor speed increases creating lift. With decreased fuel supply, rotor speed decreases, reducing lift. A governor or the like (not shown) may be used to limit rotor speed to prevent overspeeding of rotor 150. In an alternative embodiment, a variable pitch rotor may be used, within the spirit and scope of the present invention. In such an embodiment, pitch may be changed to increase or decrease lift.

As previously noted, in the preferred embodiment, directional control may be achieved by tilting the rotor in a particular direction using a tilting action at the hub of rotor 150. However, other control mechanisms may be used within the spirit and scope of the present invention. For example, a traditional cyclic control may be used to alter the pitch of individual rotor blades at different portions of the rotor cycle, in order to alter thrust in a particular direction.

The apparatus 100 of the present invention provides many advantages over that of Prior Art helicopters and the like. Should a pilot run out of fuel or experience engine failure (e.g., flameout), the apparatus may auto-rotate toward the ground, reducing the speed of impact. An optional ballistic parachute 190 or the like (e.g., non-ballistic parachute) may be employed as well, extending from the rotor hub 195 or other location. Since the apparatus already is slowed by auto-rotation, a smaller parachute may be employed than traditionally used in ballistic parachute applications. Or, in an alternative embodiment, a larger size parachute may be employed, to provide a slow rate of descent even in the event of a rotor or hub failure (i.e., where lack of autorotation occurs).

FIG. 2 is a top view of power ring 230. Power ring 230 may include a number of struts 130 attaching ring 230 to a central hub. A number of ram jets (e.g., two) 180 may be attached to power ring 230. When ramjets 180 are activated, power ring 230 rotates, creating rotary shaft motion at the hub.

Rotor 150, may comprise a fixed or variable pitched rotor, or the like. In the preferred embodiment, a single fix pitched rotor is employed with four lifting blades. Torque effects produced by the power ring is counteracted, at least in part, by the use of lifting rotor 150.

Sound proofing shroud 110 may be supported by one or more struts 140, which may attach to frame 170 which may be configured to carry one or more passengers, or in a Remotely Operated Vehicle (ROV) embodiment, may support control and communications equipment. In additions, struts 135 (FIG. 4) may be provided to secure a top portion of shroud 110 to hub 137 or other location. Any number of struts 135, 140 may be used. In the embodiment illustrated, four of each struts 135, 140 are employed, although other numbers of struts may be provided to reduce vibration and provide structural integrity to the design. Struts 135 and hub 137 are not shown in FIGS. 1 and 5 for the sake of clarity. Starting engine and control unit 120B may contain a small starting engine used to drive the power ring so as to provide initial rotation to start ramjets 180. Many types of ramjets require initial air flow in order to ignite, and starting engine and control unit 120B provides such initial controlStarting engine and control unit 120B may also contain a fuel supply, instrumentation and electronics, and a control yoke, as shown. Note that other types of controls may be used, including a joystick, levers, pedals, and the like.

In the preferred embodiment, rotors 150 comprise a fixed pitch rotor in order to simplify the design. Vertical lift may be controlled by controlling the rpm of lifting rotor 150 simply by throttling fuel supply to ramjets 180. With increased fuel supply to the power ring, rotor speed increases creating lift. With decreased fuel supply, rotor speed decreases, reducing lift. A governor or the like (not shown) may be used to limit rotor speed to prevent overspeeding of rotor 150. In an alternative embodiment, variable pitch lifting rotors may be used, within the spirit and scope of the present invention. In such an embodiment, pitch may be changed to increase or decrease lift.

As previously noted, in the preferred embodiment, directional control may be achieved by tilting the rotor in a particular direction using a tilting action at the hub of rotor 150. However, other control mechanisms may be used within the spirit and scope of the present invention. For example, a traditional cyclic control may be used to alter the pitch of individual rotor blades at different portions of the rotor cycle, in order to alter thrust in a particular direction. In addition, weight shifting by the operator may be used to alter direction of the apparatus.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A vertical take off and landing rotorcraft comprising:
a plurality of rotor blades rotatably mounted on a hub to a central shaft;
a power ring, configured to not substantially contribute to lift, rotatably mounted via a plurality of struts, to a concentric shaft, concentric with the central shaft;
at least one thrust engine mounted to the power ring, for rotating the power ring and the concentric shaft;
a transmission, coupled to the central shaft and the concentric shaft, for converting rotary motion of the concentric shaft to rotary motion in an opposite direction of rotation of the central shaft, to rotate the plurality of rotor blades to provide lift; and
a shroud, surrounding the power ring, for containing noise from the at least one thrust engine; and
a frame, coupled to the transmission, and supporting the shroud, the frame providing a mounting point for the shroud and means to carry a load entirely beneath the power ring;
wherein the rotating mass of the power ring counteracts torque of the plurality of rotor blades; and
wherein the plurality of rotor blades are solely powered by the at least one thrust engine, via the central shaft, the transmission, and the power ring.

2. The vertical take off and landing rotorcraft of claim 1, wherein the at least one thrust engine comprises at least one or more of a jet engine, rocket engine, pulse-jet engine, and ramjet.

3. The vertical take off and landing rotorcraft of claim 2, wherein the at least one thrust engine comprises a pair of ramjets, mounted 180 degrees apart on the circumference of the power ring.

4. The vertical take off and landing rotorcraft of claim 1, wherein the plurality of rotor blades rotatably mounted on the hub to the central shaft comprises a plurality of fixed-pitch rotor blades, wherein thrust is controlled by varying rotational speed of the plurality of rotor blades by throttling the at least one thrust engine.

5. The vertical take off and landing rotorcraft of claim 1, wherein the plurality of rotor blades rotatably mounted on the hub to the central shaft comprises four variable-pitch rotor blades wherein thrust is controlled by varying pitch of the four variable pitch rotor blades.

6. The vertical take off and landing rotorcraft of claim 1, wherein the transmission further includes a starting engine, to provide an initial rotation to the power ring for starting the at least one thrust engine.

7. The vertical take off and landing rotorcraft of claim 1, wherein the hub is tilted to provide directional thrust to control direction of the vertical takeoff and landing rotorcraft by tilting the plurality of rotor blades as a unit.

8. The vertical take off and landing rotorcraft of claim 5, wherein the plurality of rotor blades comprises a plurality of variable-pitch rotor blades wherein the pitch of the four variable pitch rotor blades is varied to control direction of the vertical takeoff and landing rotorcraft.

9. The vertical take off and landing rotorcraft of claim 1, further comprising:
   a deployable parachute, mounted to the hub, for slowing descent of the vertical takeoff and landing rotorcraft when deployed.

10. A vertical takeoff and landing rotorcraft comprising:
    a plurality of rotor blades rotatably mounted on a hub to a central shaft;
    a power ring, configured to not substantially contribute to lift, rotatably mounted via a plurality of struts, to a concentric shaft, concentric with the central shaft;
    a plurality of ramjets, mounted to and spaced substantially evenly around the power ring, for rotating the power ring and the concentric shaft;
    a transmission, coupled to the central shaft and the concentric shaft, for converting rotary motion of the concentric shaft to rotary motion in an opposite direction of rotation of the central shaft, to rotate the plurality of rotor blades to provide lift;
    a circular shroud, surrounding the power ring such that the plurality of ramjets travel within the circular shroud, for containing noise from the plurality of ramjets;
    a frame, coupled to the transmission, and supporting the circular shroud, the frame providing a mounting point for the circular shroud and means to carry a load entirely beneath the circular shroud,
    wherein the rotating mass of the power ring counteracts torque of the plurality of rotor blades; and
    wherein the plurality of rotor blades are solely powered by the plurality of ramjets, via the central shaft, the transmission, and the power ring.

11. The vertical takeoff and landing rotorcraft of claim 10, wherein the plurality of rotor blades rotatably mounted on the hub to the central shaft comprises a plurality of fixed-pitch rotor blades, wherein thrust is controlled by varying rotational speed of the plurality of rotor blades by throttling the plurality of ramjets.

12. The vertical takeoff and landing rotorcraft of claim 10, wherein the plurality of rotor blades rotatably mounted on the hub to the central shaft comprises four variable-pitch rotor blades wherein thrust is controlled by varying pitch of the four variable pitch rotor blades.

13. The vertical takeoff and landing rotorcraft of claim 10, wherein the transmission further includes a starting engine, to an provide initial rotation to the power ring for starting the plurality of ramjets.

14. The vertical takeoff and landing rotorcraft of claim 10, wherein the hub is tilted to provide directional thrust to control direction of the vertical takeoff and landing rotorcraft by tilting the plurality of rotor blades as a unit.

15. The vertical takeoff and landing rotorcraft of claim 10, wherein the plurality of rotor blades rotatably comprises a plurality of variable-pitch rotor blades wherein the pitch of the variable pitch rotor blades is varied to control direction of the vertical takeoff and landing rotorcraft.

16. The vertical takeoff and landing rotorcraft of claim 10, further comprising:
    a deployable parachute, mounted to the hub, for slowing descent of the vertical takeoff and landing rotorcraft when deployed.

* * * * *